Jan. 23, 1923.                                                    1,442,943
                              J. D. HALL.
                    DIFFERENTIAL FOR MOTOR VEHICLES.
                         FILED MAR. 3, 1922.

Inventor
John D. Hall
By Frease and Bond
Attorneys

Patented Jan. 23, 1923.

1,442,943

UNITED STATES PATENT OFFICE.

JOHN D. HALL, ORRVILLE, OHIO.

DIFFERENTIAL FOR MOTOR VEHICLES.

Application filed March 3, 1922. Serial No. 540,697.

*To all whom it may concern:*

Be it known that I, JOHN D. HALL, a citizen of the United States, residing at Orrville, in the county of Wayne and State of Ohio, have invented a new and useful Differential for Motor Vehicles, of which the following is a specification.

This invention relates to a differential for motor vehicles and has for its object to provide a device of this character in which the driving wheels are loosely mounted upon opposite end portions of a one piece drive axle, an independent clutch being provided upon each drive wheel for connecting the same to the drive axle, each clutch being controlled automatically by the adjacent front wheel of the vehicle, the device being so constructed that both of the drive wheels are normally connected to the drive axle when the vehicle is being driven straight ahead, the clutch upon the inside drive wheel being automatically opened, allowing the wheel to turn freely upon the axle, while the vehicle is turned in either direction.

With these objects in view, the invention consists in the construction and arrangement of parts, hereinafter described and illustrated in the accompanying drawings, it being understood that various changes in the form and details of construction may be made within the scope of the appended claims.

The invention thus set forth in general terms is illustrated in the accompanying drawings, in which—

Figure 1:
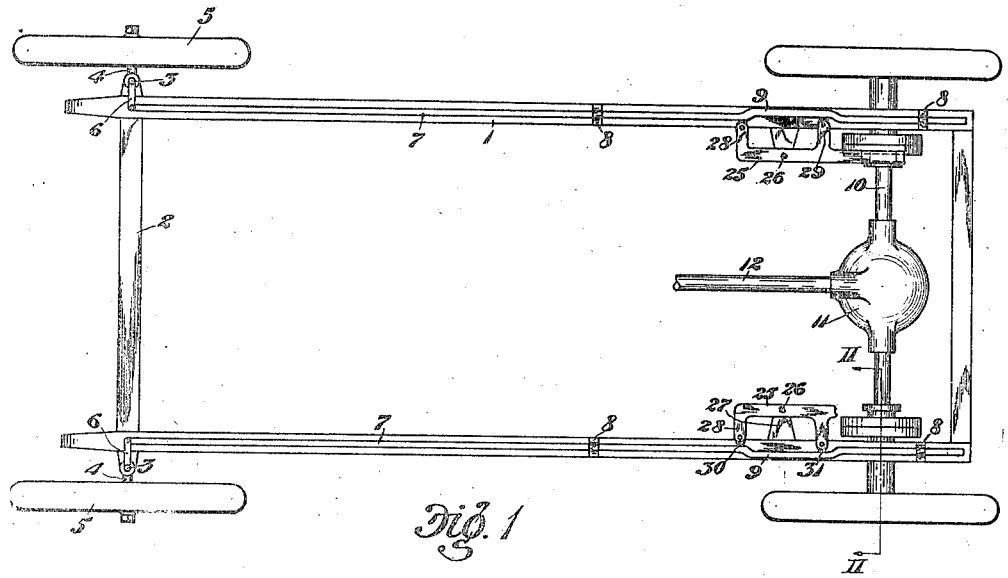
Figure 3:
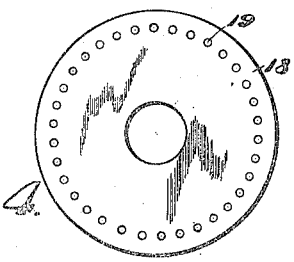
Figure 5:
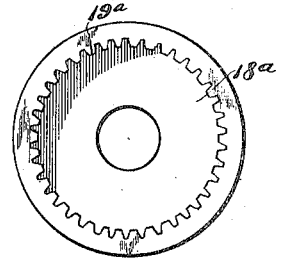
Figure 2:
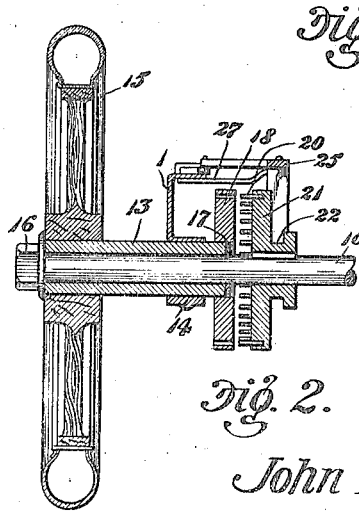

Figure 1 is a plan view of the frame of a motor vehicle provided with a differential constructed in accordance with the invention, parts being broken away for the purpose of illustration;

Fig. 2, a section on the line 2—2, Fig. 1;

Fig. 3, a perspective view of one of the levers which controls the operation of the clutch upon each driving wheel;

Fig. 4, an end elevation of the clutch member connected to each wheel;

Fig. 5, a similar view of a modified form of clutch member; and

Figure 6:
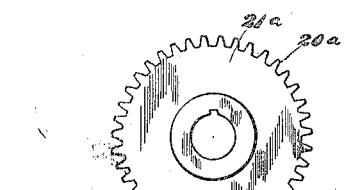

Fig. 6, an end elevation of a modified form of the movable clutch member.

Similar numerals of reference indicate corresponding parts throughout the drawing.

The main frame of a motor vehicle is designated by the numeral 1 and the front axle 2 is shown connected thereto in the usual manner and provided with the usual vertical posts 3 pivotally mounted in the end portions of the axle and provided with the spindles 4, upon which the front wheels 5 are mounted. All of this construction may be of any usual and well known type and any conventional form of wheel gear may be utilized for turning the front wheels.

An inwardly disposed arm 6 is fixed to the upper end of each of the posts 3 and has pivotally connected thereto the forward extremity of an operating rod 7, which is mounted upon the frame and extends to the rear thereof, being slidably located through guides 8. An off-set portion 9 is provided near the rear end of each of the operating rods 7.

The rear axle 10 may be driven by any suitable gearing located in the housing 11 and connected by means of the shaft 12 with the motor. Each end of the rear axle is journaled in a sleeve 13 which is rotatably mounted in a bearing 14 carried on the under side of the frame 1.

Each rear wheel 15 is fixedly mounted upon the adjacent sleeve 13, the usual hub cap or nut 16 being provided upon the outer end of the rear axle and a collar 17 being fixed upon the axle and engaging the inner end of the sleeve, thus allowing the sleeve to rotate freely upon the axle, but preventing longitudinal movement thereof.

A clutch member such as is shown at 18 is fixed upon the inner end of the sleeve 13 and is provided near its periphery with the apertures 19 arranged to receive the pins 20 which are carried upon the sliding clutch member 21, which is splined upon the rear axle 10 and arranged to be moved into engagement with the clutch member 18.

An annular groove 22 is formed in the sliding clutch member 21 and the pins 23 carried by the depending arms 24 of the lever 25, extend into said groove. The lever 25 is pivoted at 26 upon a bracket 27 mounted upon the frame. Arms 28 and 29 are provided upon the lever 25, rollers 30 and 31 respectively being carried at the outer ends of said arms and arranged to engage the adjacent operating rod 7.

As shown in Fig. 1, when the front wheels are turned straight ahead, the roller upon the arm 28 of each lever will be in engagement with the adjacent operating rod, near the forward end of the off-set portion 9, while the roller upon each arm 29 will be in engagement with the off-set portion 9 near the rear end thereof, thus holding both of the clutches upon the rear wheels in engagement, both rear wheels being thus coupled to the rear axle.

When the front wheels are turned in either direction, the operating rod 7 upon the outer side will be moved rearwardly, the adjacent lever 25 remaining in the same position, holding the clutch upon the outer wheel in engagement, while the operating rod upon the inner side will be moved forwardly, the roller upon the arm 29 thereof being moved out of engagement with the off-set portion of the rod, while the roller upon the arm 28 is moved into engagement with the off-set portion 9, rocking the lever upon its pivotal point and sliding the clutch member 21 out of engagement with the clutch member 18, allowing the inner rear wheel to rotate freely upon the axle.

In Fig. 5, is shown a modified form of the clutch member which may be mounted upon the sleeve 13 instead of the clutch member 18, and which comprises a disk $18^a$ having internal gear teeth $19^a$ arranged to be engaged by the teeth $20^a$ upon the disk $21^a$ which may be substituted for the sliding clutch member 21.

It will be evident that with a device of the character above described, both of the rear wheels will be connected to the driving axle when the automobile is being driven straight ahead, while when the vehicle is turned in either direction, the inner rear wheel will always be automatically disconnected from the axle and allowed to rotate freely thereon, while the outer rear wheel will remain engaged with the driving axle, thus allowing the inner rear wheel to be rotated at less speed than the outer rear wheel.

I claim:—

1. In a motor vehicle, a frame, a driving axle, driving wheels loosely mounted thereon, clutch members upon the axle arranged to engage said driving wheels, a lever pivoted upon the frame and engaging each clutch member, angular arms upon each lever, steering wheels, an operating rod operatively connected to the steering knuckle of each steering wheel and longitudinally slidable upon the frame and an off-set portion upon each operating rod arranged to alternately engage the arms of the adjacent lever.

2. In a motor vehicle, a frame, a driving axle, driving wheels loosely mounted thereon, clutches upon the axle for engagement with the driving wheels, a lever pivoted upon the frame and engaging each clutch, angular arms upon each lever, one of said arms being of greater length than the other, rollers upon the extremities of said arms, steering wheels and an operating rod operatively connected to the steering knuckle of each steering wheel, and slidably mounted upon the frame and an opposite portion upon each operating rod arranged to alternately engage the rollers upon the arms of the adjacent lever.

3. In a motor vehicle, a frame, a driving axle, driving wheels loosely mounted thereon, a clutch member carried by each driving wheel, a sliding clutch member fixed upon the driving axle and arranged to engage each of the first named clutch members, each of said sliding clutch members having an annular groove, a lever pivoted upon the frame and provided with a yoke engaging the annular groove of each sliding clutch, angular arms upon each lever, rollers upon the extremities of said arms, steering wheels, a rock arm movable with the steering knuckle of each steering wheel, an operating rod pivotally connected to each rock arm and slidably mounted upon the frame, and an off-set portion upon each operating rod arranged to alternately engage the rollers upon the arms of the adjacent lever.

JOHN D. HALL.